US007890390B2

(12) United States Patent
Cochran et al.

(10) Patent No.: US 7,890,390 B2
(45) Date of Patent: Feb. 15, 2011

(54) MANAGING PART NUMBER PREFERREDNESS

(75) Inventors: William H. Cochran, Rochester, MN (US); Joel Popelsky, Highland Mills, NY (US); Gary A. Tressler, Sandy Hook, CT (US); David R. Whalen, Middletown, NY (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 11/548,761

(22) Filed: Oct. 12, 2006

(65) Prior Publication Data
US 2008/0091442 A1      Apr. 17, 2008

(51) Int. Cl.
*A01K 5/02* (2006.01)
*G06F 17/60* (2006.01)
(52) U.S. Cl. ............................................. 705/29; 705/7
(58) Field of Classification Search ..................... 705/29
See application file for complete search history.

(56) References Cited

U.S. PATENT DOCUMENTS

| | | | | |
|---|---|---|---|---|
| 5,777,877 A * | 7/1998 | Beppu et al. | .................. | 700/97 |
| 5,920,867 A * | 7/1999 | Van Huben et al. | ................ | 1/1 |
| 6,650,954 B2 * | 11/2003 | Zulpa et al. | .................. | 700/107 |
| 6,813,749 B2 * | 11/2004 | Rassaian | ......................... | 716/4 |
| 6,826,538 B1 * | 11/2004 | Kalyan et al. | .................. | 705/7 |
| 6,999,965 B1 * | 2/2006 | Cesarotti et al. | ............ | 707/100 |
| 2002/0165805 A1 * | 11/2002 | Varga et al. | .................... | 705/28 |
| 2003/0004597 A1 * | 1/2003 | Zulpa et al. | .................. | 700/106 |
| 2005/0021348 A1 * | 1/2005 | Chan et al. | ..................... | 705/1 |
| 2006/0129261 A1 * | 6/2006 | Morita et al. | ............... | 700/103 |
| 2006/0184432 A1 * | 8/2006 | Hanechak | ..................... | 705/27 |

OTHER PUBLICATIONS

Witness Systems Drives Workforce Optimization into the Enterprise with Strategic Acquisitions, Business Wire, New York: Oct. 2, 2006.*

* cited by examiner

*Primary Examiner*—Matthew S Gart
*Assistant Examiner*—Garcia Ade
(74) *Attorney, Agent, or Firm*—DeLio & Peterson, LLC; Kelly M. Nowak; Yuanmin Cai (57) ABSTRACT

Methods, systems and apparatus for defining, updating and communicating the current status of parts used by an enterprise to designers and procurement specialists. Allowable values of preferredness of parts are defined based on technology roadmaps, and these values are periodically checked in a current time period against certain criteria, and changes are made in the preferredness values to reflect current conditions in the time period and current estimates for future conditions. Software, including algorithms, is changed as required to implement the changes in the preferredness values, and the updated software is released for use by procurement and design personnel for ensuring consistency of values of preferredness and preferred part codes within an enterprise.

17 Claims, 6 Drawing Sheets

| ROADMAP SYMBOL | ALLOWABLE VALUES FOR PREFERREDNESS | ALLOWABLE VALUES FOR PREFERRED PART CODE |
|---|---|---|
| $ | STRATEGIC PART | AA |
| ◉ | CORPORATE PREFERRED | BLANK |
|  | DIVISION PREFERRED* | AB,AC,AD,AF,AH,AI,AS |
| ▨ | NOT PREFERRED | 1-3, 5-9, A-G |
| ☒ | NOT PREFERRED | 1-4 |

* ONLY ALLOWED FOR P/N'S RELEASED OUTSIDE OF THE MEMORY PROCUREMENT ORGANIZATION

FIG. 7

| PATTERNED PART CODE | DEFINITION |
|---|---|
| 1 | NO KNOWN SUPPLIER |
| 2 | SUPPLIER SOURCING NOT ENTERPRISE CONTROLLED |
| 3 | FIELD-USE, OBSOLETE OR END-OF-LIFE PART |
| 4 | HIGH BUSINESS RISK (DPL, SSL, ETC.), CONTINUITY OF SUPPLY AT RISK |
| 5 | HIGH PERMANENT TECHNICAL RISK |
| 6 | NOT QUALIFIED TO COUNCIL REQUIREMENTS |
| 7 | SOURCING NOT FROM COUNCIL CORE SUPPLIERS |
| 8 | CUSTOM DESIGNED PART |
| 9 | CUSTOM HIGH RELIABILITY PART |
| A | NON-STRATEGIC PART PACKAGING |
| B | NON-STRATEGIC SHIPPING PACKAGING |
| C | PART NOT BEST COST/PERFORMANCE FUNCTION |
| D | DUPLICATE PART NUMBER |
| E | BETTER PART AVAILABLE WITH GOOD SUPPLY (NOTE 1) |
| F | OLD OR SUNSET TECHNOLOGY |
| G | NO KNOWN SUPPLIER |
| AA | UNRESTRICTED |
| AB | DIVISION USAGE ONLY |

NOTE 1: USED FOR P/N'S IN PREFERRED OR SUNSET TECHNOLOGIES

INCREASE IN SEVERITY

MANAGING PART NUMBER PREFERREDNESS

BACKGROUND OF THE INVENTION

1. Field of the Invention

The present invention is generally directed to parts procurement, and in particular, to methods, systems and apparatus for updating and communicating the current status of parts used by an enterprise to designers and procurement specialists

2. Description of Related Art

It is generally known in the manufacturing industry that a product is only as good as its collective components. In the early design phase of a product development cycle, design engineers are tasked with selecting the parts that will be incorporated into a product design. While the selections made by the designer may be technically sound, they may not always be the most cost effective from a financial standpoint. This is because the designer is often not privy to important business data, such as, cost rebates available from a particular supplier. Further, these part selections may not be the most pragmatic from a logistical standpoint since the designer is not equipped with the business skills or knowledge of a procurement specialist. As a result, parts having some business and/or technical risks may be passed on to development for use in a product design.

Procurement specialists evaluate the business risks associated with particular part selections. This is accomplished by examining various factors associated with such part selections, such as, reliability, supplier technology and capability, availability, etc.

It is, therefore, desirable to provide methods, systems and apparatus for reviewing parts status, flagging problem and/or risk parts, and taking any actions necessary to mitigate such problems and/or risks as early in the design phase as possible. These methods, systems and apparatus will avoid delivering parts having business and/or technical risks to development, thereby improving production yields, lead times and costs.

SUMMARY OF THE INVENTION

Bearing in mind the problems and deficiencies of the prior art, it is therefore an object of the present invention to provide methods, systems and apparatus for reviewing parts status and identifying any problem and/or risk parts.

Another object of the present invention is to provide methods, systems and apparatus for preventing delivery of parts having business and/or technical risks associated therewith to development.

It is another object of the present invention to provide methods, systems and apparatus for updating and communicating a current status of parts used by an enterprise to designers and procurement specialists for improving production yields, lead times and costs.

Still objects of the present invention are to provide methods, systems and apparatus for defining allowable values of preferredness of parts based on technology roadmaps, checking the accuracy of present values against certain predefined criteria, and ensuring consistency of values of preferredness and preferred part codes within an enterprise.

Other objects and advantages of the invention will in part be obvious and will in part be apparent from the specification.

The above and other objects, which will be apparent to those skilled in art, are achieved in the present invention, which is directed to, in a first aspect, a method for managing component preferredness for components used in products. The method includes providing technology roadmaps identifying components available for particular technologies and assigning preferredness values for these components. Periodically, selected ones of the roadmaps are reviewed in a current time period and changes are made in the preferredness values to reflect current conditions in the time period and current estimates for future conditions. Software, including algorithms, is changed as required to implement the changes in the preferredness values, and the updated software is released for production use by procurement and design personnel. Once the software has been updated, the review of the selected ones of the roadmaps may then be re-run using this updated software.

The components are preferably procured commodities. In assigning the preferredness values, these values are preferably assigned using a plurality of symbols that identify each components' preferredness status.

In accordance with the invention, the method further includes selecting selected part numbers from a database that are associated with a technology for review, and then determining if a roadmap is associated with this technology.

If a roadmap is associated with the technology, then those part numbers not requiring a check are filtered out of the process. Those part numbers requiring a check are then grouped into (N+1) groups, where N is the number of distinct symbols used in the roadmap for the current time period. Each of N groups is associated with a symbol in the technology roadmap and the (N+1)th group contains part numbers in the technology that are not included in the technology roadmap. It may then be determined if the current preferredness values are consistent with any previously made revisions. Those parts in the (N+1)th group are reviewed for correct parameters selected from a set of parameters associated with a technology that does not have a roadmap.

If, however, it has been determined that the technology for the selected part numbers does not have a roadmap associated therewith, then the process continues by determining if the selected part numbers have an allowable preferredness value. If these selected part numbers do not have an allowable preferredness value, then such part numbers are added to an error report. This error report is reviewed in the step of periodically reviewing roadmaps in a current time period for making any required changes in the preferredness values to reflect current conditions and estimates for future conditions.

The invention also includes systems and program storage devices capable of carrying out the method steps described herein.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-7 of the drawings in which like numerals refer to like features of the invention.

Definitions relevant to the present invention are as follows:

Preferred Part. A preferred part is one that the technology development councils have determined to be of more value to the enterprise from a technical and business standpoint as compared to another part. Preferred parts are divided into two areas: technology and suppliers.

The following criteria may be used for defining preferred parts according to technology:

Industry standard. This element is concerned with whether or not the part is readily available from the industry. Wide acceptance of a part in the industry usually means good supply and price.

Number of suppliers. The number of suppliers producing the technology is helpful in assessing whether or not sufficient suppliers exist to satisfy enterprise and industry demand.

Continuity of supply. This factor addresses whether there are any known issues or technical events that may affect supply. For example, a natural disaster, such as, an earthquake or a serious fire may affect a supplier's ability to manufacture parts.

Adequate lead times/capacity. This element is concerned with the amount of planning needed to ensure continuity of supply. Long lead times usually mean insufficient supply.

Quality/reliability. This element addresses whether or not there are any known issues that may affect the enterprise's ability to ship a product due to a supplier's manufacturing and/or design issue.

Manufacturability. This factor establishes whether the technology under evaluation lends itself to problem-free assembly in the enterprise-designated assembly facility. For example, a certain package design may be more difficult to solder onto a card versus another package design.

Technical advantage. This element assesses whether use of the technology gives the enterprise a technical advantage in the market place. For example, one type of part may increase a machine's technical performance as compared to another type of part (microprocessor A works better in a design than microprocessor B).

Position in the technology life cycle. This item addresses whether this technology will be available for the life of an enterprise program or whether there will be a need to execute an end-of-life exercise. An end-of-life exercise includes analysis of total parts requirements (from many machines or designs) for the remainder of a manufacturing period (e.g., from today until the date manufacturing will stop), establishing supply to fulfill those requirements, and inventory storage of the parts.

The following criteria may be used for defining preferred parts according to supplier selection.

Supplier technology. Suppliers are compared to one another in the areas of quality/reliability; the ability to offer leading edge technology, steps they are taking to improve technology, and the ease with which the supplier may be qualified for the enterprise's products.

Supplier menu. Supplier menu refers to the nature and scope of its product offerings and how well the supplier's offerings match enterprise needs (i.e., technology road map convergence as discussed further herein).

Pricing. This factor looks not only at current price offerings but also whether the supplier provides aggressive pricing throughout the product life, whether the pricing is aggressive in beating the market average, and whether the supplier's pricing is aggressive across its entire offering as opposed to only select areas.

Capacity. Capacity refers to whether the supplier has the manufacturing capacity to meet enterprise or industry demand and whether it is flexible in moving from one product set to another if market conditions dictate a change.

Service. This factor assesses a supplier's serviceability to the enterprise in terms of delivery, communication, recovery capability, technical support and Electronic Data Interchange capability.

In addition to the above-described criteria, other factors may be employed by an enterprise as desired in order to establish a preferred parts definition. It should be appreciated and understood that the present parts review process tool may be implemented for use in any electronics-based industry.

Non-Preferred Part. In contrast to a preferred part, non-preferred parts are those parts that have been found to have some type of risk associated therewith. There are varying degrees of risk based on the enterprise's business and technical requirements. Risk types range from a part that will go end-of-life (EOL) during the time which the product will be using the part to a part that is no longer available requiring the substitution of a new part. Utilizing the technology and supplier criteria listed above, a parts review process tool's action plan will be executed only on these non-preferred parts to determine if the risk of using this part may impact the program's revenue commitment. If the risk is accepted, a mitigation plan will be developed to minimize the risk.

Preferredness. "Preferredness" is a rating of whether a component part is acceptable for incorporation in a design of a product. Various methods of assigning values and various ranges of values may be used. Preferredness must have at least two values, preferred and not preferred, with other intermediate values being available as options. In one variation, an additional value of sunset is used to denote parts that are adequate at present, but will soon not be suitable. For example, a technology may be adequate but one or more parts in the technology may be not preferred for certain business reasons.

Again, evaluation teams and council members for an enterprise determine the preferred parts that a designer should consider first for use in a design. Using a preferred part often means that development and procurement experts who make up these teams/councils have determined that the part is readily available in the industry (no supply issues), is technically sound, will be available throughout the life of a specified program, is being procured at the lowest cost available, amongst other criteria. Using these preferred parts, a strategy or preferred parts action plan is developed. Once in place, it is communicated to all development and other interested personnel of the enterprise via a web site. The web site contains a visual picture of the strategy, i.e., roadmap, a methodology to find a list of parts that match the roadmap, a contact list, a price projection, and market conditions (current and future predicted).

However, establishing a preferred parts list is only a portion of the process necessary to ensure that optimal resources are being utilized by the enterprise. A preferred part can easily become non-preferred overnight. Ongoing reviews of technology and suppliers qualifications may be necessary. Existing parts become obsolete while emerging technologies continue to offer new and improved parts in the market place. Furthermore, design groups may tend to develop loyalties to existing parts with which they are familiar, without consideration of whether the parts continue to be cost effective for the enterprise.

It has been found that availability, price and other relevant data change often, so that there is a need for defining and updating values of preferredness and related data and communicating the current status to both the procurement and design groups.

Accordingly, the present invention is directed to methods, systems and apparatus for defining, updating and communicating the current status of parts used by an enterprise to designers and procurement specialists. In particular, the invention defines allowable values of preferredness of parts based on technology roadmaps, checks the accuracy of present values against certain criteria, and ensures consistency of values of preferredness and preferred part codes within an enterprise. In so doing, the invention enables the review and management of parts status, flagging problem and/or risk parts, and taking any actions necessary to mitigate such problems and/or risks as early in the design phase as possible.

Figure 1:
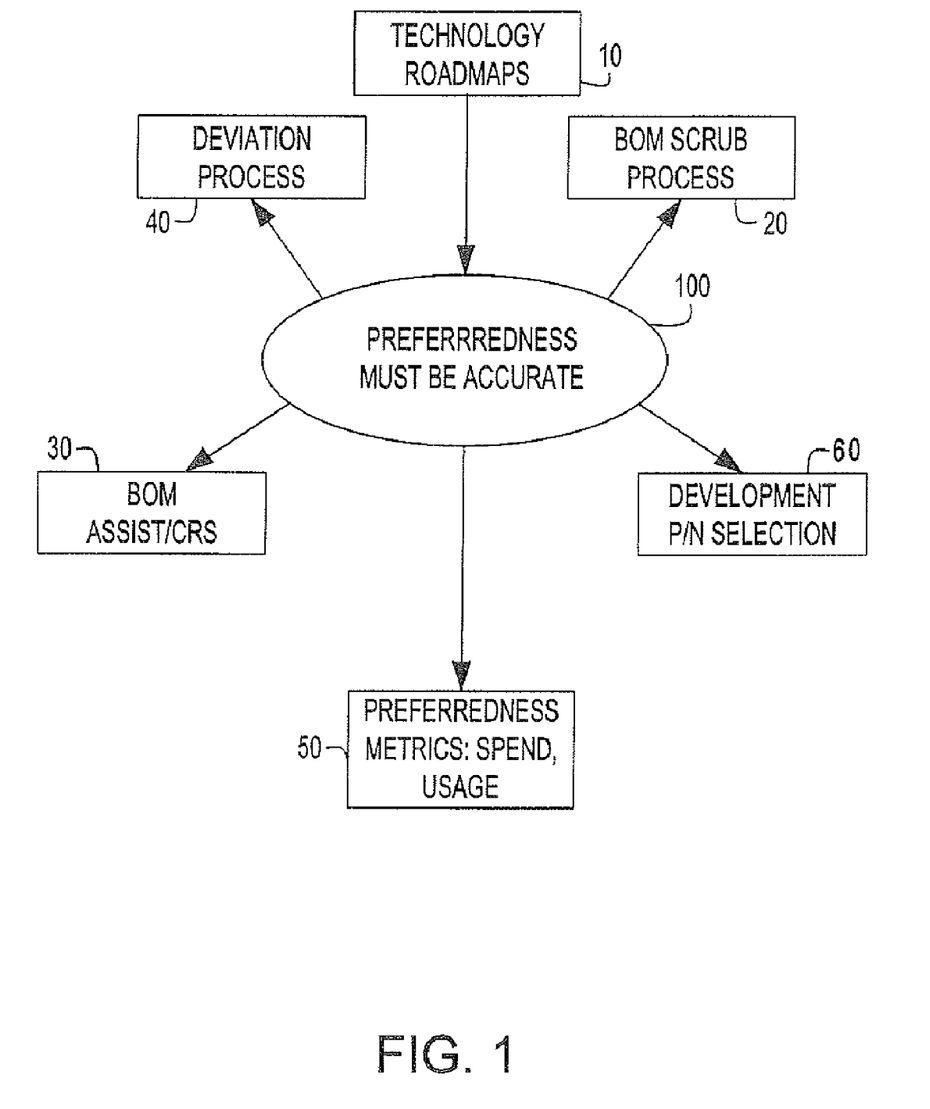
FIG. 1 shows the relationship between preferredness, technology roadmaps, and users of preferredness values.

Referring now to the drawings, FIG. 1 shows the relationship between preferredness, technology roadmaps, and users of preferredness values. The relevance of accuracy in the assignment of preferredness values to various parts that go into a product is also shown. Box 10 shows the current state of the relevant technology roadmap(s), while box 50 represents the dependency that various Enterprise metrics have on Preferredness. For example, one Enterprise metric having an affect on Preferredness is the measurement of percentage willing to spend on preferred parts versus the percentage willing to spend on non-preferred parts. Another Enterprise metric having an affect on Preferredness is the measurement of percent of preferred parts on a Bill of Materials (BOM) (i.e., usage).

Oval 100 is at the center of the spectrum, which represents the importance of accuracy in maintaining the correct values of preferredness. Maintaining the correct values of preferredness is important since this information is used for selection of parts by development for use in a new product (box 60). It is also used in a Deviation database, shown in box 40, such as the Deviation database described in U.S. Pat. No. 6,650,954, which is assigned to the assignee of the present invention. Preferably, the deviation database contains all non-preferred parts extracted from a database along with key data that identifies the part and the program that uses the part. This database also contains data describing why the part was used and the status of the risk review.

Box 20 BOM Scrub Process is a formal process in which Procurement Engineering reviews BOMs for upcoming product announcements. This process typically looks at BOMs in the early part of the design cycle and focuses exclusively on Non Preferred parts, flagging these parts based on the value of Preferredness it has in the database. The Scrub Process results in a formal position statement (e.g. non-support, alternative recommendations) from Procurement back to the designer The importance of accuracy in maintaining the correct values of preferredness in oval 100 is also important for the BOM Assist/CRS of box 20. The correct values of preferredness is used in the BOM Assist/CRS system by designers to enter a BOM for the purpose of acquiring procurement recommendations or new part numbers. One function of the system allows designers to view Preferredness for selected parts. Another function allows the system to auto respond to requests for existing part numbers. This auto response is based on the Preferredness and Preferred Part Code values in the database for the existing part.

Figure 2:
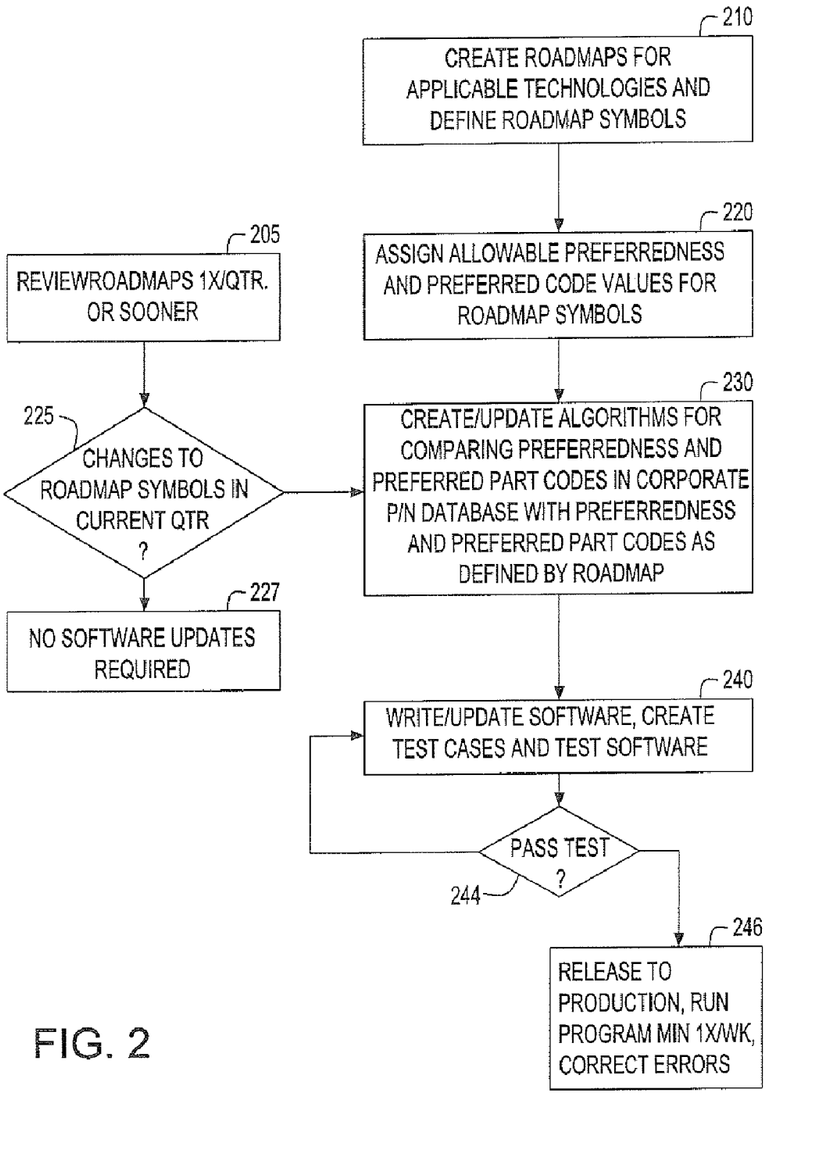
FIG. 2 shows the flow chart of a process of the invention that manages component preferredness.

For ease of understanding the invention, FIG. 2 shows a preferred system with its process flow in accordance with the invention for managing component preferredness. FIG. 2 shows an overall preferred flow chart illustrating the process of going from a technology roadmap to an algorithm for comparing the preferredness values in the relevant database used by product designers with the values defined and updated by the current technology roadmap.

Box 210 starts with the current (corporate) technology roadmap for the particular technology being processed (e.g. memory chips). The basis for the corporate roadmap is the industry roadmap, since it is assumed that the enterprise must adapt to what is available in the market. The enterprise will make its own decision as to when it will start and stop using a particular level of technology, so that the corporate roadmap will in general differ from the industry roadmap. For example, if the industry roadmap predicts that 32 Meg memory chips will be available in production quantities in the second quarter of 2006, the enterprise will have to decide if a product scheduled for sale in the third quarter of 2006 should be designed with such chips. The risk, of course, is that if the parts are not available at that time, and thus, the product cannot be built and shipped, or it cannot be shipped with the predicted cost.

Once the roadmaps are created, Box 220 represents the process of assigning preferredness values to the various symbols that are made available to the designers. For example, a decision will need to be made as to when a mature component should no longer be incorporated into new designs. Illustratively, the decision is made by a committee including members from the development group and from the procurement group, referred to as a Technology Development Council (TDC).

These roadmaps are periodically reviewed (box 205) to check if technical or market conditions require changing a symbol definition. A decision (decision diamond 225) must then be made to determine whether a change is required in the definition(s) used in the internal roadmaps. If no change is required, the process ends in box 227.

However, if a change is required, then an essential feature of the invention is that the algorithm(s) used in the enterprise database are changed or updated. In so doing, a loop is executed to write test cases and update the software in box 240, returning to revise the software if the changes are not correct (diamond 244). Once the software has been correctly updated, the process ends in box 246, with the dissemination of the revised software to be run when required, e.g. once a week.

Figure 3:
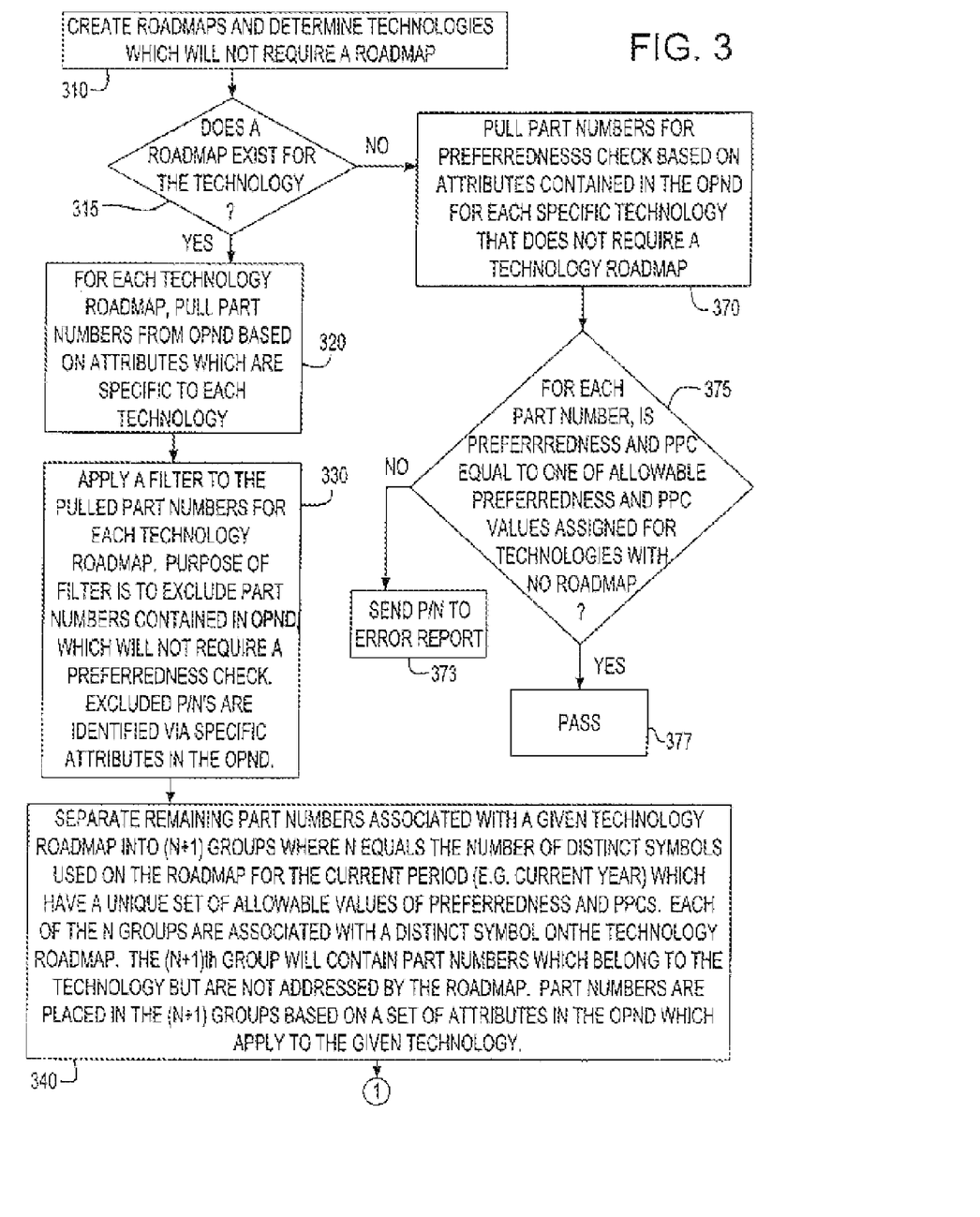
FIG. 3 shows a component process within the process of FIG. 2.

FIG. 3 shows the implementation of box 230 in FIG. 2. Box 310 overlaps box 210 in FIG. 2, creating roadmaps for some technologies and determining other technologies that do not require a roadmap. It is then determined whether or not a roadmap exists for a given technology in diamond 315.

If a roadmap exists for a particular technology, then for each technology roadmap, part numbers are pulled from the enterprise database that are specific to a particular technology. The process continues to box 330 where a filter is applied to the data to filter out those part numbers that do not require a check, and such parts are then removed from the process.

Once the filter process is applied, in box 340 the remaining part numbers are separated by association with a given technology roadmap into (n+1) groups based on a set of attributes in the OEM Part Number Database (OPND), where n equals the number of distinct symbols used on the roadmap for the current period. That is, box 340 represents a sort process in which the part numbers in the technology are grouped into N groups corresponding to N relevant symbols on the roadmap, plus a catch-all group that is represented in the technology but are not addressed by the roadmap. The grouping is preferably based on attributes stored in the database that apply to the technology.

In each of the N groups, the process continues by testing if the current numbers for preferredness and Preferred Part Codes (PPC) are consistent with and accurately reflect any previously made revisions, as is shown in diamond 342-1, etc. For example, it can be assumed that the stored values are those permitted by the system, i.e. they appear on the list of FIG. 7, since this list has been previously checked. Errors that have been made, resulting in the PPC not allowed by the system will be recognized in the course of the process. If it is determined that the current numbers for preferredness and PPC are consistent with and accurately reflect any previously made revisions, then the process flow moves on (box 344). If no, the part number is included in an error report for correction (box 345).

In the catch-all group of part numbers, these part numbers are all sent to the error report (box 350). In response to this grouping, an action is then taken (box 355) by either updating the roadmap to accommodate the group (box 356) or ignore the part number during subsequent processing (box 358).

In the event a part number entry in the database is correct (from boxes/steps 342-1 and 344), it is then determined whether or not the preferredness or PPC meets additional predetermined failure criteria (box 360). If the part number does not fit into any relevant additional or supplemental criterion, the process ends in box 362. However, if the part number does fit into any such criterion, that part also is added to the error report (box 364). For example, a supplemental rule may be that a part may not be labeled "Preferred" if there is a single source of supply. In such an event, this part is flagged with a special PPC and will be added to the error report.

Steps or boxes 340-364 above all refer to the embodiment wherein the part numbers have an associated roadmap. However, wherein the part numbers do not have an associated roadmap, then the process flow continues to step/box 370.

In the event that a technology does not have an associated roadmap, then the part numbers are pulled from the database to perform a check thereon based on attributes contained in the OPND for each specific technology that does not require a technology roadmap (box 370). The database is then searched to determine if the part numbers in this category have an allowable preferredness value and/or a PPC that is assigned for technologies with no roadmap (box 375). If the part number or PPC is correct, the process ends in box 377. However, if one of the entries is incorrect, the part number is added to the error report. Parts with an error report are reviewed. If a software change is required, then such change is made and then the data is re-run using this changed software. If a software change is not required, the entries in the database are updated manually.

Figure 4:
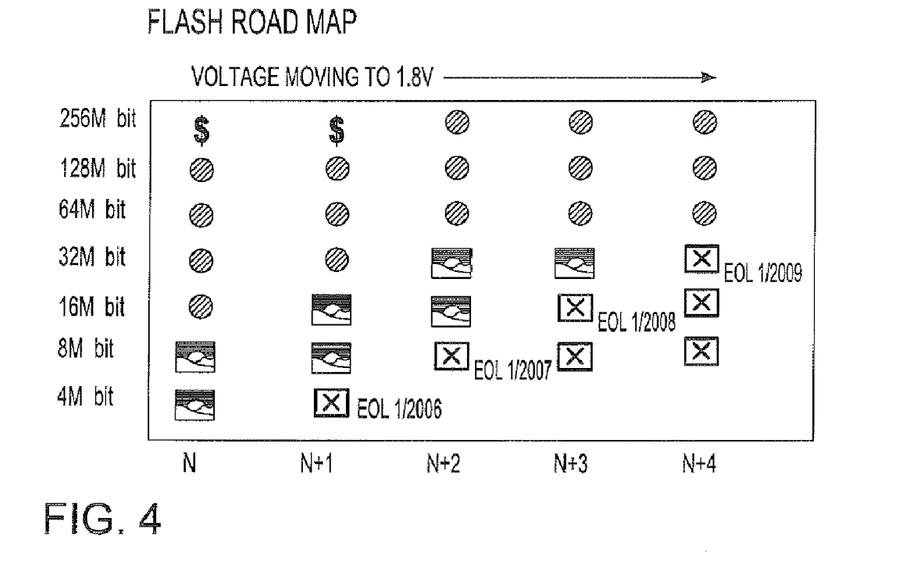
FIG. 4 shows an example of a symbolic roadmap.
Figure 5:
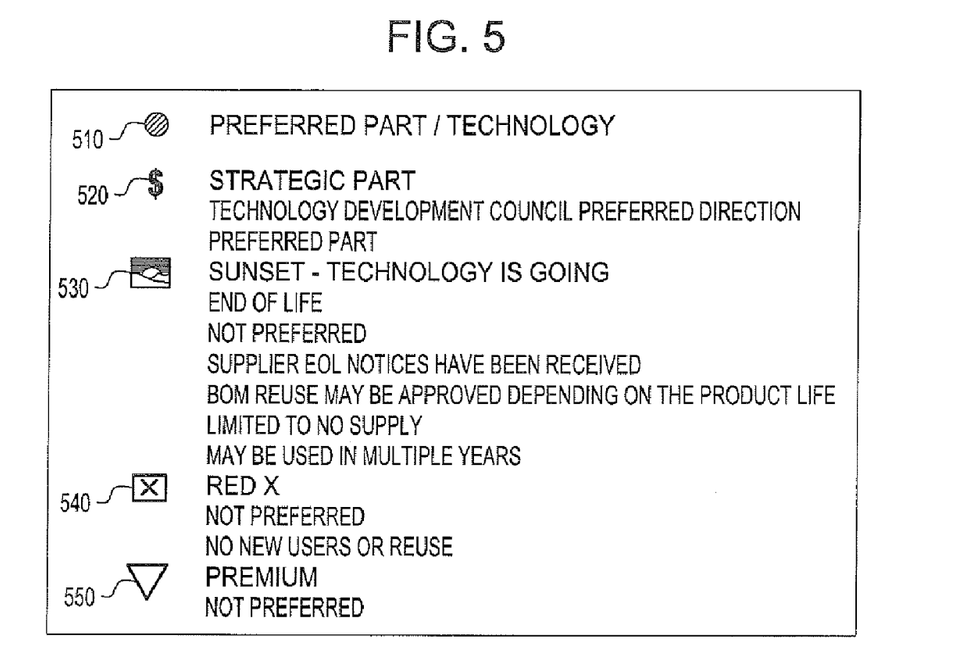
FIG. 5 shows definitions of the symbols of FIG. 4.

Referring to FIG. 4, an example of a symbolic roadmap for the present invention is shown. This symbolic roadmap is an example of an enterprise technology roadmap, in this case for memory, for conveying information to designers and others. As is shown, an array of symbols for each technology, which are defined in FIG. 5, are shown organized by time, with each row containing a list of generic part types in a particular technology. Each column in the roadmap represents status of the parts listed at the relevant time, with the predicted status in future years. The time units on the x axis are in year N, year (N+1), etc. to year N+4.

A designer seeking to learn if a part is approved will click with his mouse on the symbol (e.g., the 32 Mbit circle) in the current year N. When the designer clicks on any of the symbols, a list of search criteria is shown which tells the designer how to find all part numbers in the database for every part type shown. The designer would then go to the database and enter the search criteria for the part type of interest. A list of 32 Mbit part numbers with PPC codes, shown in FIG. 7, will be displayed showing those parts that are permitted and/or those parts that are not permitted for the designer's use.

The roadmap shown in FIG. 4 is one that shows a fast-moving technology to designers and others. For example, the 16 Mbit and 32 Mbit parts go from preferred (no permission needed to use them) to forbidden in a period of four years. The present invention is advantageous for these rapidly-changing technologies due to the invention's ability to update status in response to changing circumstances and to reconcile decisions made by design groups and procurement groups.

Referring to the definition of symbols in FIG. 5, circles 510 represent preferred parts and no permission is needed to design them into a product. However, it should be appreciated and understood that the circle represents "preferred" for the technology itself but there are times where there could be a part number within a preferred technology that is not preferred. For example, if a part number preferredness is at PPC=2, this may represent that a company has no control over the supplier chosen by the designer for such part number and that the chosen supplier is not one of the companies' core suppliers (even though such company has a set list of preferred suppliers). With this in mind, the part number at PPC=2 is still an allowable value.

As another example, another part number may be listed as a preferred technology and single sourced (even though other suppliers are available but not used) with this single source issuing an end-of-life (EOL) announcement. This part number may still be a preferred technology since "X" other suppliers exist who are offering such part and there are no indications that these suppliers will go EOL. In such an event, the part number may be listed as a PPC=3, which is valid for the part number. Alternatively, a PPC of PPC=E may be used for single sourced part numbers that fall within a preferred (i.e., circle symbol) or sunset (i.e., sunset symbol) technology, which is also valid for that part number but the supplier has not gone EOL. Such an event within a preferred technology is allowed because otherwise parts will not error out when they are really errors.

Continuing to refer to the symbols shown in FIG. 5, the dollar sign 520 indicates a part that is desirable, but not yet ready for sale in production quantities. This also requires no special permission in the example of FIG. 4.

The sunset symbol 530 is used for parts that are not preferred and ordinarily may not be designed into a new product, since the part will probably no longer be available while the product containing it still has a market. The roadmap of FIG. 4 is illustrative of a typical case and does not attempt to cover all possibilities. For example, if the product is designed for the automotive market or for a government customer, the customer typically demands that the product and replacement parts be kept available for a lengthy period, typically ten years. Since the roadmap assumes that parts will go from production to unavailable in four years (e.g. the 32 MBit chip) a company supplying this market will need to have a contract in place with a reliable vendor that commits to keep the part in production for a sufficient length of time. The existence of such a contract and the reliability of the vendor will add an extra dimension to this roadmap and its symbols.

The Red X 540 represents a part that will not ordinarily be designed into a product or kept in an updated version of an old product. One simple reason for this status is that the vendors have announced that the part will no longer be sold during the lifetime of the product containing it. Not shown in FIG. 4 are premium parts 550, which are those parts that are not low cost and are not highly available in the industry.

Figure 6:
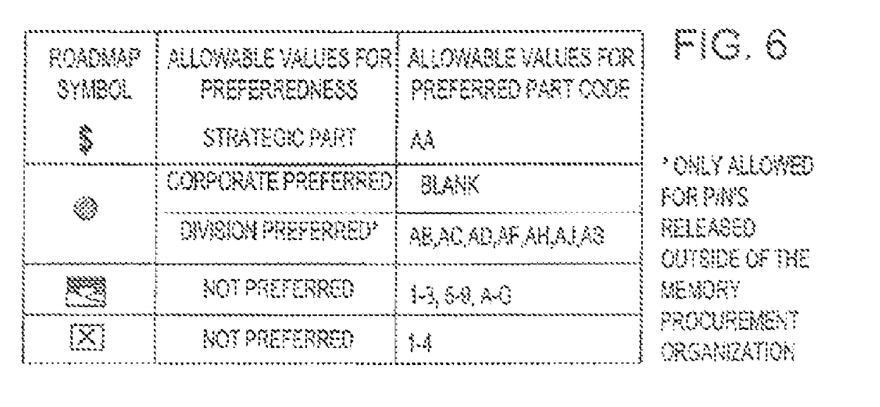
FIG. 6 shows a table of allowable values of preferredness for the various symbols.

FIG. 6 illustrates the optional feature of Preferred Part Codes, which indicate the reason for the Not-Preferred status. This gives a designer who wants to use the part an indication of why the part should not be used. The two approved symbols 510 and 520 have been previously explained. The status of "Division Preferred" is intended to accommodate situations in large enterprises where one group has different needs than another. This provides needed flexibility to avoid interfering with the business of one group in order to impose unneeded uniformity on the enterprise.

Figure 7:
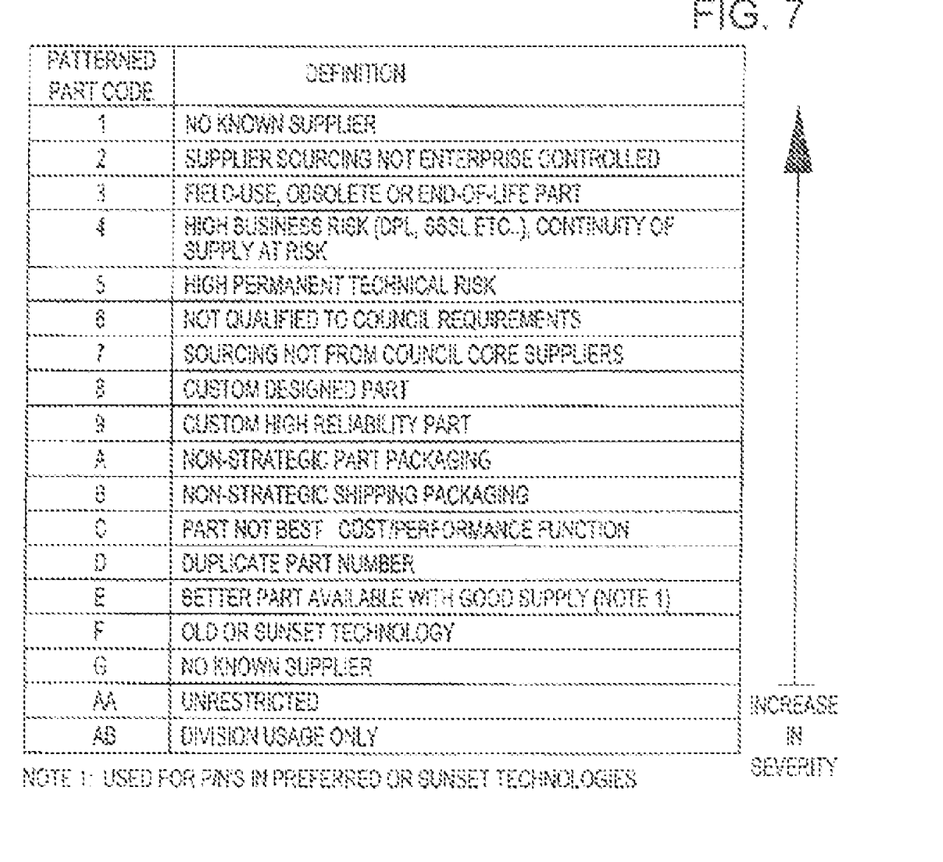
FIG. 7 shows a table of definitions of preferredness values.

FIG. 7 shows an illustrative list of preferred part codes and their definitions. Codes AB to AS represent blanket exceptions for divisions that have different needs or constraints from the rest of the enterprise. For example, if the automotive division needs to have parts available for a longer term than the rest of the company, it may have blanket permission to use old parts that are off the roadmap, assuming of course that provision has been made for an adequate supply.

The present invention advantageously manages component preferredness and ensures data consistency across all communication media. While the invention can be applied to any type of component, it is preferably applied to any type of procured commodity/component that is either inter-enterprise (internal to) or intra-enterprise (external to). The invention easily develops and clearly defines allowable values of preferredness and preferred part codes for commodity part numbers based on technology roadmaps. These preferredness and preferred part codes are consistent within procurement and development, and are used to classify the risk associated with every component part number. By periodically checking these defined preferredness and preferred part codes for part numbers, the invention advantageously ensures that products are designed and manufactured with such part numbers that have the lowest possible risk of negatively impacting revenue, quality, and reliability of the resultant product.

It should be appreciated that components of the present invention may be embodied as a computer program product stored on a program storage device. These program storage devices may be devised, made and used as a component of a machine that utilizes optics, magnetic properties and/or electronics to perform certain of the method steps of the present invention. Such program storage devices may include, but are not limited to, magnetic media such as diskettes or computer hard drives, magnetic tapes, optical disks, Read Only Memory (ROM), floppy disks, semiconductor chips and the like. A computer readable program code means in known source code may be employed to convert certain of the method steps described below. This computer readable program code contains instructions embodied in tangible media, such as floppy disks, CD-ROMS, hard drives, or any other computer-readable storage medium, wherein, when the computer program code is loaded into and executed by a computer, the computer becomes an apparatus for practicing the invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of managing component preferredness for components that are used in products comprising the steps of:
providing on a computer technology roadmaps identifying components available for particular technologies;
assigning preferredness values for said components on said computer, said preferredness values indicating a rating of whether each of said components is acceptable for incorporation into a design of a product;
identifying from said technology roadmaps a roadmap for a selected technology;
retrieving part numbers of components specific to said selected technology;
identifying and filtering out from the process those retrieved part numbers that do not require a check so that only those part numbers that require a check remain;
periodically reviewing in a current time period said identified roadmap and determining for the remaining part numbers whether said assigned preferredness values accurately reflect current conditions in said time period and current estimates for future conditions, and if not, further making changes in said preferredness values based upon said determination to reflect said current conditions;
changing software on said computer, including algorithms, as required to implement said changes in said preferredness values; and
releasing from said computer updated software for production use by procurement and design personnel.

2. The method of claim 1 wherein said components comprise procured commodities.

3. The method of claim 1 wherein said preferredness values are assigned using a plurality of symbols identifying each said components' preferredness status.

4. The method of claim 1 wherein if a roadmap is associated said technology, the method further comprising filtering out those part numbers not requiring a check.

5. The method of claim 4 further comprising grouping any remaining part numbers into (N+1) groups, where N is the number of distinct symbols used in the roadmap for said current time period, each of N groups is associated with a symbol in said technology roadmap and the (N+1)th group contains part numbers in said technology that are not included in said technology roadmap.

6. The method of claim 5 further comprising determining whether said current preferredness values are consistent with any previously made revisions.

7. The method of claim 5 further comprising a step of reviewing parts in said (N+1)th group for correct parameters selected from a set of parameters associated with a technology that does not have a roadmap.

8. The method of claim 1 wherein if a roadmap is not associated said technology, the method further comprising determining if said selected part numbers have an allowable preferredness value.

9. The method of claim 8 wherein if said selected part numbers do not have an allowable preferredness value, the method further comprising adding said part number to an error report, said error report being reviewed in said periodic review step.

10. The method of claim 1 further comprising re-running said review of said selected ones of said roadmaps using said updated software.

11. A computer program product comprising: a computer usable medium having computer readable program code for managing component preferredness for components that are used in products, the computer program product having: computer readable program code causing a computer to provide technology roadmaps identifying components available for particular technologies; computer readable program code causing a computer to assign preferredness values for said components, said preferredness values indicating a rating of whether each of said components is acceptable for incorporation into a design of a product; computer readable program code causing a computer to identify from said technology roadmaps a roadmap for a selected technology; computer readable program code causing a computer to retrieve part numbers of components specific to said selected technology; computer readable program code causing a computer to identify and filter out from the process those retrieved part numbers that do not require a check so that only those part numbers that require a check remain; computer readable program code causing a computer to periodically review in a current time period said identified roadmap and determining for the remaining part numbers whether said assigned preferredness values accurately reflect current conditions in said time period and current estimates for future conditions, and if not, further making changes in said preferredness values based upon said determination to reflect said current conditions; computer readable program code causing a computer to change software, including algorithms, as required to implement said changes in said preferredness values; and computer readable program code causing a computer to release updated software for production use by procurement and design personnel.

12. The computer program product of claim 11 further comprising computer readable program code causing a computer to re-run said review of said selected ones of said roadmaps using said updated software.

13. The computer program product of claim 11 further comprising computer readable program code causing a computer to group selected part numbers into (N+1) groups, where N is the number of distinct symbols used in the roadmap for said current time period, each of N groups is associated with a symbol in said technology roadmap and the (N+1)th group contains part numbers in said technology that are not included in said technology roadmap.

14. The computer program product of claim 11 further comprising computer readable program code causing a computer to determine if selected part numbers have an allowable preferredness value.

15. A program storage device readable by a processor capable of executing instructions, tangibly embodying a program of instructions executable by the processor to perform method steps for managing component preferredness for components that are used in products, said method steps comprising:
provinding technology roadmaps identifying components available for particular technologies;
assigning preferredness values for said components, said preferredness values indicating a rating of whether each of said components is acceptable for incorporation into a design of a product;
identifying from said technology roadmaps a roadmap for a selected technology;
retrieving part numbers of components specific to said selected technology;
identifying and filtering out from the process those retrieved part numbers that do not require a check so that only those part numbers that require a check remain;
periodically reviewing in a current time period said identified roadmap and determining for the remaining part numbers whether said assigned preferredness values accurately reflect current conditions in said time period and current estimates for future conditions, and if not, further making changes in said preferredness values based upon said determination to reflect said current conditions;
changing software, including algorithms, as required to implement said changes in said preferredness values; and
releasing updated software for production use by procurement and design personnel.

16. The program storage device of claim 15 wherein if it has been determined that a roadmap is associated with the technology, said method steps further include grouping selected part numbers into (N+1) groups, where N is the number of distinct symbols used in the roadmap for said current time period, each of N groups is associated with a symbol in said technology roadmap and the (N+1)th group contains part numbers in said technology that are not included in said technology roadmap.

17. The program storage device of claim 15 wherein if it has been determined that a roadmap is not associated with the technology, said method steps further include determining if selected part numbers have an allowable preferredness value, and if not, adding said part number to an error report, said error report being reviewed in said periodic review step.

* * * * *